United States Patent Office 3,470,226
Patented Sept. 30, 1969

3,470,226
POLYBUTADIENE ORGANOSILICON POLYMERS HAVING POLYOXYALKYLENE GROUP ATTACHED TO THE SILICON ATOMS
John Beckett Plumb, West Kilbride, and Ronald Sangster Stuart, Saltcoats, Scotland, assignors to Imperial Chemical Industries Limited, London, England, a corporation of Great Britain
No Drawing. Filed Oct. 14, 1966, Ser. No. 586,638
Claims priority, application Great Britain, Oct. 23, 1965, 44,973/65
Int. Cl. C07f 7/18; C08f 27/12
U.S. Cl. 260—448.8      10 Claims

ABSTRACT OF THE DISCLOSURE

Organosilicon polymers are prepared wherein polybutadiene is reacted with a compound $HSiR_b''X_{3-b}$ where $R''$ is a hydrocarbyl group and X is a halogen and $b$ is 0, 1 or 2. The product obtained is reacted with a monohydroxy polyoxyalkylene to give butadiene organosilicon polymer having polyoxyalkylene group attached to the silicon atoms. The polymers are surfactants and are especially useful in producing polyurethane foams.

---

This invention relates to new and useful organosilicon polymers and more particularly to such polymers which are of enhanced value as surfactants.

A wide variety of organosilicon polymers are known and are readily available. Among these are included a class in which polyoxyalkylene groups are attached to silicon atoms which form part of a polysiloxane block either by a Si—O—C linkage or by a Si—C linkage. This class is very useful and valuable, for example, as surfactants for a variety of purposes such as in the manufacture of polyurethane foams.

According to the present invention a new and useful organosilicon polymer comprises a polybutadiene having in the chain at least one unit of the general formula

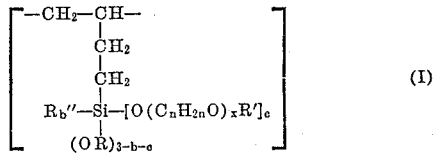   (I)

in which R and $R''$ are hydrocarbyl or substituted hydrocarbyl groups, $R'$ is a hydrocarbyl or substituted hydrocarbyl group or an acyl group, $b$ is 0, 1 or 2, $c$ is 1, 2 or 3, $b+c$ is not greater than 3, $n$ is 2, 3 or 4 and $x$ is an integer from 2 to 100.

The other units, if any, on the chain may be mainly of the formula

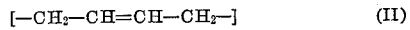   (II)

or

   (III)

The polymers of our invention may, however, also contain other units such as those of general formula

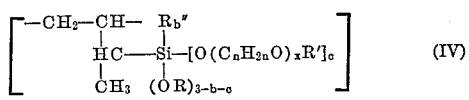   (IV)

and

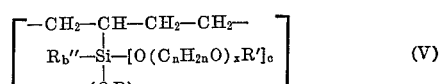   (V)

in which the symbols have the values given above.

The groups R may be selected from a variety of hydrocarbyl or substituted hydrocarbyl groups including, for example, ethyl, n-propyl, isopropyl, n-butyl, isobutyl, isooctyl, cyclohexyl, phenyl, tolyl, naphthyl, benzyl, etc., or a substituted hydrocarbyl group containing substituents such as, for instance, chloro, cyano, hydrocarbyloxy or carbo-hydrocarbyloxy groups. Lower alkyl groups, i.e. having not more than 8 carbon atoms are generally preferred and isobutyl groups are particularly preferred.

The groups $R'$ may be selected from a wide variety of hydrocarbyl or substituted hydrocarbyl groups including ethyl, n-propyl, isopropyl, n-butyl, isobutyl, iso-octyl, cyclohexyl, phenyl, tolyl, naphthyl, benzyl, etc., or a substituted hydrocarbyl group containing substituents such as for example, chloro, cyano, hydrocarbyloxy or carbohydrocarbyloxy groups, or may be an acyl group such as an acetyl, propionyl, butyryl or benzoyl group. Alkyl groups having not more than 10 carbon atoms, phenyl groups and cyclohexyl groups are normally preferred.

The groups $R''$, if present, may also be selected from a wide variety of hydrocarbyl or substituted hydrocarbyl groups including methyl, ethyl, n-propyl, isopropyl, n-butyl, or higher alkyl groups, cyclohexyl, phenyl, tolyl, benzyl, or phenylethyl groups. In general, however, methyl groups are preferred. While $b$ may be 0, 1 or 2 it is in some cases preferred that it be 0.

In many cases $c$ is preferred to be 1 although, of course, it can be 1, 2 or 3. The proportion of silicon atoms in the polymers of our invention may vary widely, for example, from 0.1 up to 15 percent by weight.

In general it is preferred, that at least 10 percent of the polymer units be of the form given in general Formula I. It is also particularly preferred that at least 50 percent be in said form.

The polymers of our invention may be prepared by any one of several methods. In one method a low molecular weight polybutadiene, preferably of molecular weight from 200 to 10,000 and having at least 10 percent and preferably at least 50 percent of the polymer units in the 1:2 form is reacted with a compound of the general formula $HSiR_b''X_{3-b}$ where $R''$ and $b$ are as defined and X is a halogen atom or an OR group, R being as previously defined, and the product thereafter reacted with a monohydroxy polyoxyalkylene ether to give replacement of the desired number of groups by polyoxyalkylene groups. This reaction may be carried out in the known manner for the reaction between a compound containing the $>C=C<$ group and one containing the $\equiv SiH$ group. The relative proportions of the two reactants will, of course, be determined by the proportion of silicon it is desired to have in the final product. The replacement of the X groups by the desired proportion of polyoxyalkylene groups may, when these are OR groups be carried out by any of the known transesterification techniques. When the X groups are halogen atoms these may be converted to the desired final groups by reaction with a mixture of the desired proportions of the alcohol HOR and the monohydroxy polyoxyalkylene ether. Alternatively, if desired, the halogens may first be alcoholysed to (OR) groups and the product thereafter transesterified to incorporate the desired polyoxyalkylene groups. The halogen atoms may alternatively be reacted first with the monohydroxy polyoxyalkylene ether and thereafter with the alcohol ROH.

The polybutadiene used to react with the compound $HSiR_b''X_{3-b}$ may be prepared by any method for the preparation of such polymers. Suitable methods are described in, for example, British patent specification 690,150.

The reaction between the polybutadiene and the compound $HSiR''_bX_{3-b}$ is preferably carried out in presence of a solvent. Suitable solvents which may be used include, for example, hydrocarbon solvents and ethers, such as toluene, n-heptane, di-n-butyl ether and ethylene glycol dimethyl ether.

The temperature of reaction of the polybutadiene and the compound $HSiR''_bS_{3-b}$ may vary widely, for example, from 20 to 200° C. The temperature for any particular reaction will be governed very largely by the specific reactants and catalyst and the solvent, if any, used. In many cases it is convenient and it is preferred to carry out the reaction at the reflux temperature of the reaction mixture.

It is also generally preferred to carry out this reaction at atmospheric pressure although, if desired, subatmospheric or superatmospheric pressures may be used.

While a variety of catalysts may be used it is normally preferred to use a platinum catalyst. This may be in the form of metallic platinum either as such or on a carrier, such as platinised charcoal or platinised asbestos, or in the form of chloroplatinic acid or as a complex of a platinous halide and an olefine, for example, of platinous chloride and an olefine such as cyclohexene or decene. The catalyst may be used in widely varying amounts, for example, from $10^{-7}$ to $10^{-1}$ g. atoms of platinum per mole of silicon compound.

A wide variety of silicon compounds of formula $$HSiR''_bX_{3-b}$$

may be used. Suitable compounds include, for example, dimethylchlorosilane, methyldichlorosilane, trichlorosilane, dimethylethoxysilane, phenyldiethoxysilane, tri-isobutylsilane, bis-(2-ethoxyethoxy)methylsilane and diethoxy-p-chlorophenylsilane.

The replacement of (OR) groups by polyoxyalkylene groups is normally carried out in presence of a suitable catalyst which is preferably a strong organic acid, for example, trifluoroacetic acid, or a mixture of such an acid and an alkali metal salt thereof.

The replacement of halogen atoms, when the X groups are such, by reaction with the alcohol HOR and the monohydroxy polyoxyalkylene ether is generally carried out in presence of an acid acceptor, for example, a liquid amine such as pyridine, N,N-dimethylaniline, triethylamine and the like or anhydrous ammonia.

The polymers of our invention have many valuable and useful properties and among their particularly advantageous uses is included their use as surfactants. They are moreover especially valuable for use as surfactants in the manufacture of polyurethane foams. These foams may be made in well known manner and may be rigid or flexible foams and may be made by the one-stage or by the two-stage process using the known raw materials and techniques.

Our invention is further illustrated by the following examples in which all parts are by weight except where otherwise stated.

EXAMPLE 1

1,3-butadiene was polymerised in presence of toluene using sodium naphthalene as a catalyst to give a polybutadiene in the form of a pale yellow oily liquid having an average degree of polymerisation of 6.5 and containing a high proportion of the 1,2 form (as indicated by infra-red spectroscopy).

5.4 parts of the so-prepared polybutadiene, 24.8 parts of tri-isobutoxysilane, 50 parts of toluene and 0.0175 part of a cyclohexene/platinous chloride complex were heated together under reflux for 7 hours in an inert atmosphere. The solution was thereafter filtered, the solvent removed by distillation and unreacted tri-isobutoxysilane removed by heating to 110° C. under vacuum. There were thus obtained 15.7 parts of a clear pale brown oily liquid.

5.15 parts of this liquid were added to a solution of 16.5 parts of polyoxyalkylated n-butanol of average general formula $H(OC_2H_4)_{17}(OC_3H_6)_{13}O—C_4H_9$ in 75 parts of dry toluene. 0.15 part of trifluoroacetic acid and 0.01 part of finely divided potassium hydroxide were added to the solution which was stirred and heated under partial reflux for 6 hours. During this time 75 parts of distillate were removed, the volume of the mixture being maintained constant by addition of equivalent quantities of dry toluene. After 2 hours and 4 hours a further 0.05 part of trifluoroacetic acid was added. The mixture was then cooled to 20° C. and stirred for 1 hour with 1.0 part of anhydrous potassium carbonate, filtered and solvent removed by distillation. There was thus obtained 20 parts of a clear pale brown oily liquid.

100 parts of oxypropylated glycerol of molecular weight 3,000, 49.7 parts of a 80:20 mixture of 2.4- and 2,6-tolylenediisocyanate, 4 parts of water, 0.3 part of stannous octoate, 0.08 part of triethylenediamine and 1 part of the product prepared as described above were mixed together. There was thus obtained a resilient polyurethane foam of fine, even texture and density 1.7 lb./cu. ft.

EXAMPLE 2

1,3-butadiene was polymerised in the presence of a mixture of equal parts by volume of toluene and tetrahydrofuran at 45–80° C. using sodium naphthalene as catalyst to give polybutadien in the form of a light yellow oily liquid having average molecular weight equal to 500, a high proportion of the polymer being in the 1,2-form.

108 parts of the so-prepared polybutadiene, 496 parts of triisobutoxysilane, 1750 parts of toluene and 0.3 part of a cyclohexene/platinous chloride complex were heated together under reflux whilst stirring continuously for 6 hours in an atmosphere of nitrogen. The toluene was then removed by distillation and unreacted triisobutoxysilane was removed from the residue by heating to a temperature of 120° C. at a pressure of 0.05 mm. Hg. In this way, 424 parts of a clear pale yellow oil were obtained.

120 parts of the oil thus obtained were added to 360 parts of polyoxyalkylated phenol of average general formula $H(OC_2R_4)_{18.9}(OC_3H_6)_{14.3}OC_6H_5$ in 1120 parts of dry toluene. 3.0 parts of trifluoroacetic acid and 0.3 part of finely powdered potassium hydroxide were added to the solution which was stirred and heated to reflux for 4½ hours. During this time 1740 parts of distillate were removed whilst the volume of the mixture was maintained constant by simultaneous addition of fresh dry toluene. The mixture was then cooled to 20° C., stirred for 1 hour with 40 parts of powdered anhydrous/potassium carbonate, filtered, and the solvent removed by distillation under reduced pressure. There were thus obtained 395.8 parts of a clear light brown oily liquid.

A polyurethane foam was prepared by the process described in Example 1, except that the product of Example 1 was replaced by 1.0 part of the product prepared as described above. The resilient polyurethane foam obtained was similar in appearance and properties to that described in Example 1.

EXAMPLE 3

329.4 parts of oxyethylated ethyleneglycol monomethyl ether of average molecular weight 550 was dissolved in 1300 parts of toluene and the solution dried for 30 minutes by azeotropic distillation. To this solution there was then added 100 parts of the polybutadiene-triisobutoxysilane adduct of Example 2, 3.0 parts of trifluorocetic acid and 0.3 part of finely powdered potassium hydroxide. The mixture was stirred and heated under reflux for 4 hours during which time 2000 parts of distillate were removed while the volume of the mixture was maintained constant by addition of fresh dry toluene. The mixture was then cooled to 20° C., stirred for 1 hour with 40 parts of powdered anhydrous potassium carbonate, filtered, and the solvent removed under reduced pressure. There were thus obtained 413.8 parts of a clear light-brown oil.

100 parts of oxypropylated trimethylolpropane of average molecular weight 315, 145 parts of crude 4,4'-di-isocyanatodiphenylmethane, 25 parts of trichlorofluoromethane, 0.2 part of dibutyltin dilaurate, 15 parts of tri-β- chloroethyl phosphate, 1.0 part of N,N-dimethylcyclohexylamine and 1.0 part of the product prepared as described above were mixed together. There was thus obtained a rigid polyurethane foam of fine, uniform cell structure, and density 2.8 lb./cu. ft.

EXAMPLE 4

108 parts of the polybutadiene polymer of Example 2, 412 parts of triisopropoxysilane, 1750 parts of toluene and 0.3 part of a cyclohexene/platinous chloride complex were heated together under reflux whilst stirring continuously for 6 hours in an atmosphere of nitrogen. The toluene was then removed by distillation and unreacted triisopropoxysilane was removed from the residue by heating to a temperature of 120° C. at a pressure of 0.05 mm. Hg. In this way 214 parts of a clear brown oil were obtained. 120 parts of the oil thus obtained were added to 360 parts of polyoxylated cyclohexanol of average general formula $H(OC_2H_4)_{17.6}(OC_3H_6)_{13.4}OC_6H_{11}$ in 1750 parts of dry toluene. 3.0 parts of trifluoroacetic acid and 0.3 part of finely divided potassium hydroxide were added to the solution which was stirred and heated under reflux for 3 hours. During this time 1750 parts of distillate were removed whilst the volume of the mixture was maintained constant by continually adding fresh dry toluene. The mixture was then cooled to 20° C., stirred for 1 hour with 30 parts of powdered anhydrous potassium carbonate, filtered, and the solvent removed by distillation under reduced pressure. There were thus obtained 427 parts of a clear orange-brown oily liquid.

A polyurethane foam was prepared by the process described in Example 1, except that product of Example 1 was replaced by 1.0 part of the product prepared as described above. The resilient polyurethane foam obtained was similar in appearance and properties to that described in Example 1.

EXAMPLE 5

1,3-butadiene was polymerised in the presence of toluene at 45–85° C. using sodium naphthalene as catalyst to give polybutadiene in the form of a light yellow oily liquid having an average molecular weight of 530, a high proportion of the polymer being in the 1,2-form.

54 parts of the so prepared polybutadiene, 115 parts of methyldichlorosilane, 435 parts of toluene and 0.2 part of a cyclohexene/platinous chloride complex were heated together at 90° C. for 5 hours in an inert atmosphere whilst stirring continuously. Unreacted methyldichlorosilane was then removed by distillation, and distillation continued until a total of 87 parts of distillate had been removed. During this time the temperature rose to 110° C. The solution was diluted with 2170 parts of toluene, cooled to 20° C. and, whilst stirring, treated with a mixture of 237 parts of pyridine, 148 parts of isobutanol and 435 parts of dry toluene. The stirred mixture was heated under reflux for 90 minutes, cooled to 20° C. and the precipitated pyridine hydrochloride filtered off to leave a clear colourless solution which was distilled under reduced pressure to remove solvent and unreacted pyridine and isobutanol. In this way 165 parts of a light yellow viscous oil were obtained.

165 parts of the oil thus obtained were added to 480 parts of polyoxyalkylated n-butanol of average general formula $H(OC_2H_4)_{17}(OC_3H_6)_{13}OC_4H_9$ in 870 parts of dry toluene. 4.5 parts of trifluoroacetic acid and 0.3 part of finely powdered potassium hydroxide were added to the solution which was stirred and heated under reflux. Additional portions each of 0.5 part of trifluoroacetic acid were added after respectively 2 and 4 hours of heating under reflux. Heating was continued for 6 hours, and during this time 2200 parts of distillate were removed while the volume of the mixture was kept constant by addition of dry toluene. The mixture was thereafter cooled to 20° C., stirred for two hours with 30 parts of anhydrous potassium carbonate, filtered, and the solvent removed by distillation. There was thus obtained 605 parts of a clear brown oily liquid.

We claim:

1. An organosilicon polymer comprising a polybutadiene having in the chain at least 10 percent of the units of the general formula

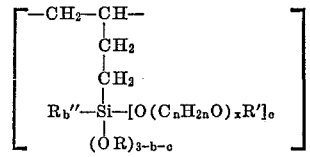

in which R is an alkyl group having not more than 8 carbon atoms, R″ is a hydrocarbyl group, R′ is selected from alkyl groups having not more than 10 carbon atoms, phenyl groups and cyclohexyl groups or an acyl group, b is 0, 1 or 2, c is 1, 2 or 3, b+c is not greater than 3, n is 2, 3 or 4 and x is an integer from 2 to 100, any other units present being selected from units of the formulae —CH₂—CH=CH—CH₂,

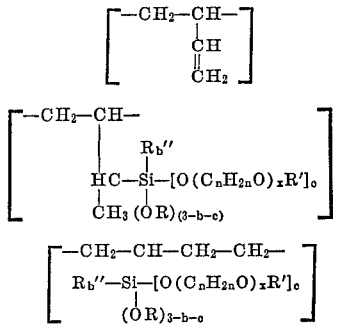

and

2. An organosilicon polymer according to claim 1 wherein R″ is selected from lower alkyl, phenyl substituted lower alkyl, phenyl and lower alkyl substituted phenyl.

3. An organosilicon polymer according to claim 1 wherein R″ is selected from methyl, ethyl, n-propyl, isopropyl, n-butyl, cyclohexyl, phenyl, tolyl, benzyl and phenylethyl groups.

4. An organosilicon polymer according to claim 1 wherein the groups R are isobutyl groups.

5. An organosilicon polymer according to claim 1 wherein the groups R″ are methyl groups.

6. An organosilicon polymer according to claim 1 where b is 0.

7. An organosilicon polymer according to claim 1 where c is 1.

8. An organosilicon polymer according to claim 1 wherein at least 50 percent of the polymer units are of the general formula

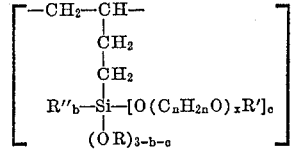

9. A process for the production of an organosilicon polymer as claimed in claim 1 comprising reacting a low molecular weight polybutadiene having at least 10 percent of the polymer units in the 1:2 form with a compound of the general formula $HSiR_b''X_{3-b}$ where R″ is a hydrocarbyl group and b is 0, 1, or 2 and X is a halogen atom or an OR group where R is an alkyl group having not more than 8 carbon atoms, and thereafter reacting the product with a monohydroxypolyoxyalkylene ether.

10. A process according to claim 9 wherein the molecular weight of the polybutadiene is from 200 to 10,000.

References Cited

UNITED STATES PATENTS

| | | | |
|---|---|---|---|
| 2,777,868 | 1/1957 | Mixer et al. | 260—448.8 XR |
| 2,777,869 | 1/1957 | Bailey et al. | 260—448.8 XR |
| 2,867,603 | 1/1959 | Safford et al. | 260—448.8 XR |
| 2,959,569 | 11/1960 | Warrick | 260—448.8 XR |
| 3,121,069 | 2/1964 | Dietz | 260—448.8 XR |
| 3,170,894 | 2/1965 | Brown et al. | 260—448.8 XR |
| 3,172,899 | 3/1965 | Bailey | 260—448.8 XR |
| 3,272,762 | 9/1966 | Ibbotson et al. | 260—448.8 XR |
| 3,342,766 | 9/1967 | Huntington | 260—448.8 XR |

TOBIAS E. LEVOW, Primary Examiner

P. F. SHAVER, Assistant Examiner

U.S. Cl. X.R.

260—2.5, 827, 94.7